United States Patent
Kaku (10) Patent No.: US 7,787,041 B2
(45) Date of Patent: Aug. 31, 2010

(54) IMAGE REPRODUCTION APPARATUS

(75) Inventor: Junya Kaku, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 1032 days.

(21) Appl. No.: 10/473,570

(22) PCT Filed: Mar. 18, 2002

(86) PCT No.: PCT/JP02/02564

§ 371 (c)(1),
(2), (4) Date: Sep. 29, 2003

(87) PCT Pub. No.: WO02/082806

PCT Pub. Date: Oct. 17, 2002

(65) Prior Publication Data

US 2004/0119845 A1 Jun. 24, 2004

(30) Foreign Application Priority Data

Apr. 5, 2001 (JP) ............................. 2001-107719

(51) Int. Cl.
*H04N 5/222* (2006.01)
*H04N 5/76* (2006.01)

(52) U.S. Cl. ............................ 348/333.02; 348/231.99; 348/231.2; 348/231.3; 348/333.01; 348/333.05; 348/333.11

(58) Field of Classification Search ................. 328/232, 328/233, 234, 240, 244, 246, 247, 248, 260, 328/263, 264; 400/76, 61, 70, 222, 207; 358/909.1, 906, 335, 310; 348/232, 208, 348/231, 239, 589, 722, 578, 563, 588, 231.99, 348/231.1–231.3, 231.5–231.7, 231.9, 241, 348/333.01–333.05, 333.11, 333.12
See application file for complete search history.

(56) References Cited

U.S. PATENT DOCUMENTS

| 5,796,428 A | * | 8/1998 | Matsumoto et al. ..... 348/207.99 |
| 6,074,111 A | * | 6/2000 | Kasahara ..................... 400/76 |
| 6,097,431 A | * | 8/2000 | Anderson et al. ......... 348/231.7 |
| 6,233,015 B1 | * | 5/2001 | Miller et al. ........... 348/333.05 |
| 6,246,797 B1 | * | 6/2001 | Castor et al. ................. 382/232 |
| 6,462,778 B1 | * | 10/2002 | Abram et al. ............... 348/239 |
| 6,618,082 B1 | * | 9/2003 | Hayashi et al. ........ 348/231.99 |
| 6,674,472 B1 | * | 1/2004 | Tsutsui .................. 348/333.05 |

FOREIGN PATENT DOCUMENTS

| JP | 05-344460 | 12/1993 |
| JP | 11-018044 | 1/1999 |
| JP | 2000-232595 | 8/2000 |
| JP | 2000232595 A * | 8/2000 |

* cited by examiner

*Primary Examiner*—David L Ometz
*Assistant Examiner*—Peter Chon
(74) *Attorney, Agent, or Firm*—Gerald T. Bodner (57) ABSTRACT

An image reproducing apparatus (10) includes a mode switch key (19) capable of switching a display mode between an image display mode and a related information display mode. When the image display mode is selected, an image reproduced from a recording medium (16) is displayed on a monitor (17), and when the related information display mode is selected, only a character relating to the image is displayed on the monitor (17). In either display mode, a monitor screen is renewed in response to an operation of a cross key (21). A CPU (15) identifies an operating manner of the cross key (21) and validates, when an on state of the cross key (21) continues more than a predetermined time period, the related information display mode.

9 Claims, 7 Drawing Sheets

| ☆ | ☆ | ☆ |
|---|---|---|
| 001 | 002 | 003 |
| ☆ | △ | △ |
| 004 | 005 | 006 |
| △ | ◎ | ◎ |
| 007 | 008 | 009 |

| GROUP START IMAGE NUMBER | MARK | BACKGROUND COLOR |
|---|---|---|
| 001 | ☆ | RED |
| 005 | △ | BLUE |
| 008 | ◎ | GREEN |
| ⋮ | ⋮ | ⋮ |
| 045 | × | YELLOW |
| ⋮ | ⋮ | ⋮ |

FIG. 12

IMAGE REPRODUCTION APPARATUS

TECHNICAL FIELD

The present invention relates to an image reproducing apparatus applied to a digital camera, for example. More specifically, the present invention relates to an image reproducing apparatus having a reproduced image display mode for displaying an image reproduced from a recording medium on a monitor screen and a character display mode for displaying only a character relating to the reproduced image on the monitor screen.

PRIOR ART

A digital camera is provided with a single image reproduction mode (normal reproduction mode) for displaying one reproduced image on a screen and a plurality of images reproduction mode (multi-reproduction mode) for respectively displaying a plurality of reproduced images on a plurality of divided screens forming the screen.

Figure 5:
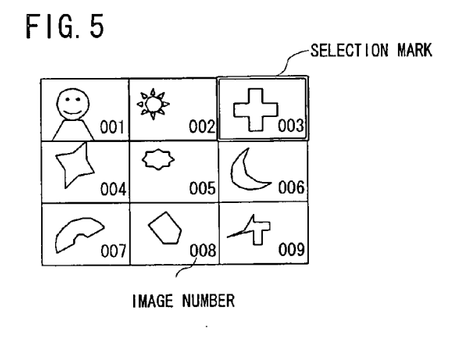
FIG. 5 is an illustrative view showing one example of an image displayed on the monitor in the image display mode belonging to a multi-reproduction mode.

In the multi-reproduction mode, nine image signals read from the recording medium and expanded are displayed on a monitor screen as shown in FIG. 5. That is, the monitor screen is divided into nine, and reduced images based on the expanded image signals are displayed on respective divided screens. An image number is applied to each of the reduced images, and furthermore, a selection mark (cursor) points any one of the reduced images.

The selection mark moves every one divided screen or every nine divided screens in response to an operation of a cross key (not shown). At this time, a reading process of a compressed image signal from the recording medium and an expansion process of the read compressed image signal are performed as necessary, and whereby, a display of the monitor screen is renewed.

When a set key (not shown) is depressed in a state the selection mark points a desired image, the desired image is full-screen-displayed on the monitor. That is, the reproducing mode is switched from multi-reproducing of nine images including the desired image to normal reproducing of the desired image. It is noted that the selection mark or the image number can be erased from the monitor screen depending upon the settings.

However, in a prior art, when the monitor screen is renewed in the multi-reproduction mode, the reading of the compressed image signal from the recording medium and the expansion of the compressed image signal are required, and therefore, there is a problem of taking too much time for searching an image by renewing a screen.

SUMMARY OF THE INVENTION

Therefore, a primary object of the present invention is to provide a novel image reproducing apparatus.

Another object of the present invention is to provide an image reproducing apparatus capable of rapidly searching a recorded image.

According to the present invention, an image reproducing apparatus which has a reproduced image display mode for displaying on a monitor screen a image reproduced from a recording medium and a character display mode for displaying on the monitor screen only a character relating to the reproduced image, comprising: an accepting means for accepting a screen renewal operation; a renewal means for renewing the monitor screen in response to the screen renewal operation; an determining means for determining an operating manner of the screen renewal operation; and a validating means for validating the character display mode when the operating manner is determined to be a first manner.

In the reproduced image display mode, the image reproduced from the recording medium is displayed on the monitor screen, and in the character display mode, only the character relating to the reproduced image is displayed on the monitor screen. In either display mode, the monitor screen is renewed in response to the screen renewal operation accepted by the accepting means. The operating manner of the screen renewal operation is determined by the determining means. When the determining means is determined to be the first manner, the character display mode is validated by the validating means.

In the character display mode, it is unnecessary to reproduce the image from the recording medium, and therefore, validating the character display mode makes a screen renewal speed high, and whereby, it is possible to rapidly search the recorded image.

In a case a manner having an operation amount of the screen renewal operation exceeding a predetermined amount is regarded as the fast manner, the character display mode is validated by the screen renewal operation exceeding the predetermined amount.

Preferably, when the operating manner is determined as a second manner after the first manner, a display mode validated before being determined to be the first manner is restored. Thus, operability is improved.

In a case a plurality of image signals recorded on the recording medium are classified as a plurality of groups, the character includes identifying information for identifying a group to which the reproduced image belongs. Thus, even if the screen is renewed at a high speed, it is possible to identify the group with ease.

In a case the image signals are recorded on the recording medium in a compressed state, the image signals reproduced from the recording medium are expanded by an expansion means. In a case of requiring such an expansion process, the screen renewal speed is lowered in the reproduced image display mode, and therefore, an advantage of validating the character display mode conspicuously appears.

The reproduced image display mode preferably includes a first image display mode for displaying one main image on the monitor screen and a second display mode for displaying a plurality of reduced images on the monitor screen. Furthermore, the character display mode preferably includes a first character display mode for displaying a character relating to one main image and a second character display mode for displaying a plurality of characters relating to the plurality of the reduced images.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
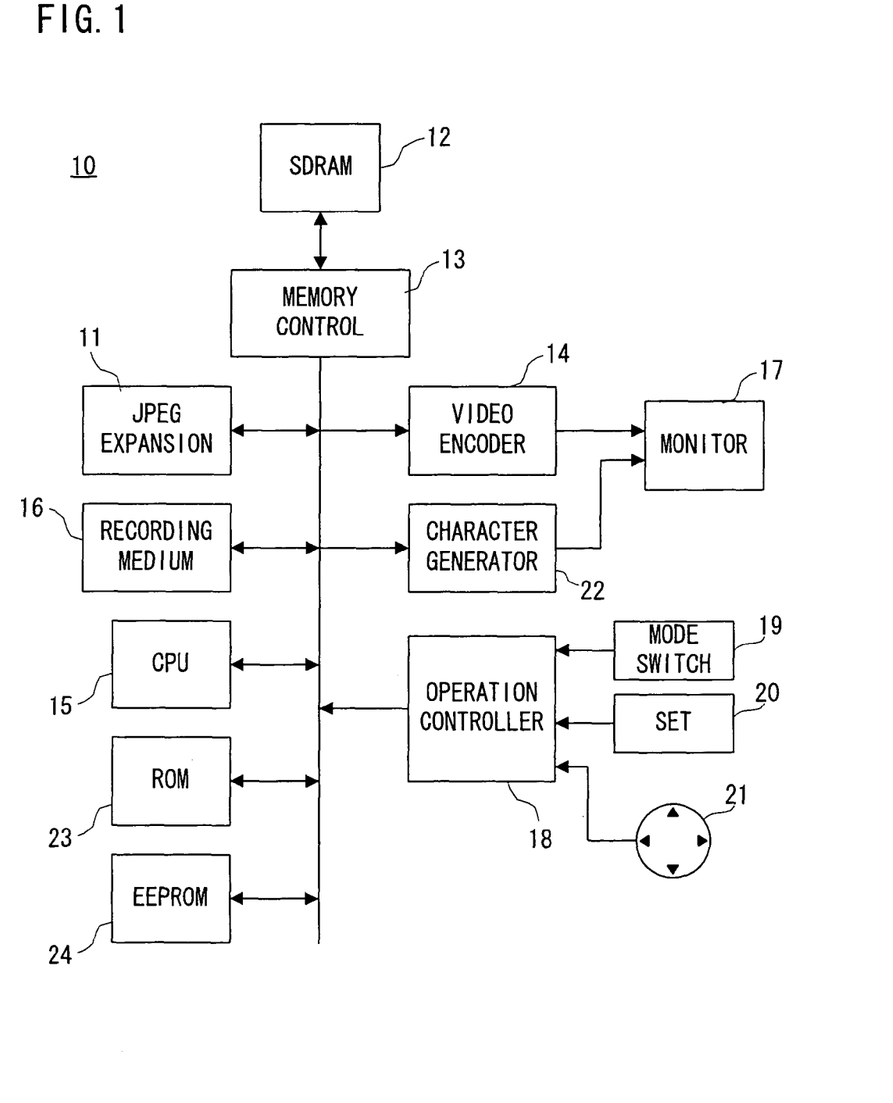
FIG. 1 is a block diagram of an image reproducing apparatus of one embodiment of the present invention.

Referring to FIG. 1, an image reproducing apparatus 10 of this embodiment integrated in a digital camera has a mode switch key 19, a set key 20 and a cross key 21 as operating keys. When any one of the operating keys is depressed, a key state signal corresponding thereto is applied from a controller 18 to a CPU 15.

The mode switch key 19 is a key for switching a display mode. The display mode is classified into a normal reproduction mode and a multi-reproduction mode each of which is classified into an image display mode and a related information display mode. When the mode switch key 19 is operated, modes are circularly switched in the following order as an image display mode belonging to the multi-reproduction mode→an image display mode belonging to the normal reproduction mode→a related information display mode belonging to the multi-reproduction mode→a related information display mode belonging to the normal reproduction mode→an image display mode belonging to the multi-reproduction mode→ . . . .

Figure 3:
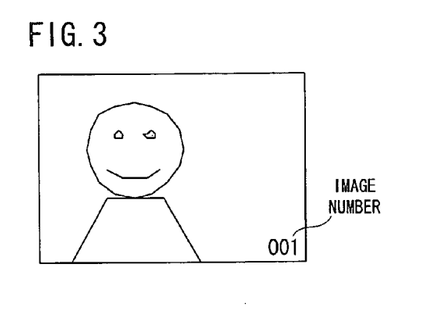
FIG. 3 is an illustrative view showing one example of an image to be displayed on a monitor in an image display mode belonging to a normal reproduction mode.
Figure 4:
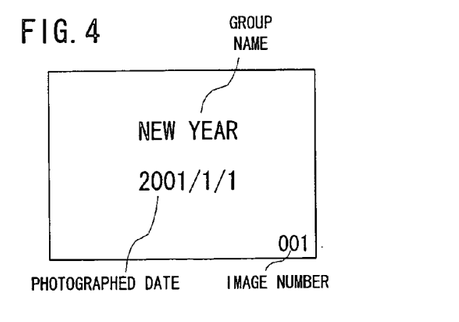
FIG. 4 is an illustrative view showing one example of an image to be displayed on the monitor in a related information display mode belonging to the normal reproduction mode.

In the image display mode belonging to the normal reproduction mode, a desired image and its image number are divisionally displayed on a monitor 17 as shown in FIG. 3. In the related information display mode belonging to the normal reproduction mode, an image number, a photographed date and a group name corresponding to the desired image are displayed on the monitor 17 as shown in FIG. 4. At this time, the desired image is not displayed.

Figure 6:
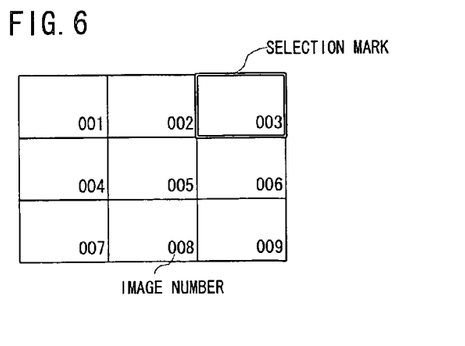
FIG. 6 is an illustrative view showing one example of an image displayed on the monitor in the related information display mode belonging to the multi-reproduction mode.

In the image display mode belonging to the multi-reproduction mode, as shown in FIG. 5, nine reduced images are divisionally displayed on the monitor 17, image numbers are assigned to respective reduced images, and a selection mark points any one of the reduced images. In the related information display mode belonging to the multi-reproduction mode, as shown in FIG. 6, nine image numbers and the selection mark pointing any one of the image numbers are displayed on the monitor 17. At this time, the reduced images are not displayed.

It is noted that a plurality of compressed image signals recorded on a recording medium 16 are classified into a plurality of groups, and group name information is assigned to each of the groups. Furthermore, photographed date information and image number information are assigned to each of the compressed image signals. The above-described image number, photographed date and group name are displayed on the basis of such the image number information, the photographed date information and the image number information. The image number information, the photographed date information and the group name information are generically defined as image related information.

Furthermore, the cross key 21 is a key for instructing a renewal of a screen display in the normal reproduction mode and for instructing a movement of the selection mark and a renewal of the screen display in the multi-reproduction mode. In the normal reproduction mode, the screen display is renewed in a forward direction in response to an operation of the cross key 21 in a right direction, and the screen display is renewed in a reverse direction in response to an operation of the cross key 21 in a left direction. In the multi-reproduction mode, the selection mark is moved in a desired direction in response to an operation of the cross key 21 in the desired direction. The image display is performed at a time the selection mark is immovable.

In addition, the set key 20 is a key which is validated in the multi-reproduction mode and full-displays a reproduced image corresponding to a current cursor position. Accordingly, the display mode is switched from the multi-reproduction mode to the normal reproduction mode by operating the set key 20.

Figure 2:
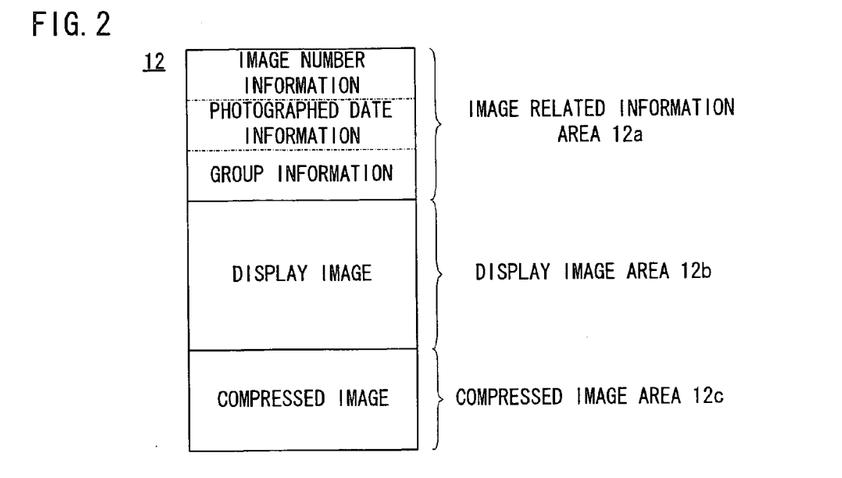
FIG. 2 is an illustrative view showing a mapping state of an SDRAM provided in FIG. 1 embodiment.

When the image display mode belonging to the normal reproduction mode is selected, the CPU 15 reads an arbitrary compressed main image signal and the image related information corresponding thereto from a detachable recording medium 16, and writes the read compressed main image signal and the image related information in an SDRAM 12 through a memory control circuit 13. The SDRAM 12 has, as shown in FIG. 2, an image related information area 12a, a display image area 12b and a compressed image area 12c, and the compressed main image signal and the image related information are written to the compressed image area 12c and the image related information area 12a, respectively.

The CPU 15 also applies an expansion instruction to a JPEG expansion circuit 11. The JPEG expansion circuit 11 reads the compressed main image signal stored in the compressed image area 12c through the memory control circuit 13, performs a JPEG expansion on the read compressed main image signal and then writes an expanded main image signal to the display image area 12b through the memory control circuit 13.

A video encoder 14 reads the expanded main image signal from the display image area 12b through the memory control circuit 13, generates a composite image signal in an NTSC format on the basis of the read expanded main image signal and applies the generated composite image signal to the monitor 17. Furthermore, the CPU 15 reads the image number information included in the image related information from the image related information area 12a through the memory control circuit 13 and instructs a character generator 22 to output a character signal corresponding to the read image number information. This allows the character signal having the desired image number to be applied from the character generator 22 to the monitor 17.

The monitor 17 is displayed with the reproduced image based on the composite image signal and the image number based on the character signal as shown in FIG. 3. According to FIG. 3, the reproduced image is full-displayed, and the image number is displayed at the lower right of the screen.

When the related information display mode belonging to the normal reproduction mode is selected, the CPU 15 reads the image related information corresponding to an arbitrary image from the recording medium 16 and writes the image related information to the image related information area 12*a* of the SDRAM 12 through the memory control circuit 13. The CPU 15 succeedingly reads the image number information, the photographed date information and the group name information from the image related information area 12 through the memory control circuit 13 and instructs the character generator 22 to output a character signal corresponding to the image number information, photographed date information and group name information read. The character generator 22 outputs the character signal indicative of a desired image number, a desired photographed date and a desired group name on the monitor 17.

Consequently, the image number, the photographed date and the group name are displayed on the monitor 17 as shown in FIG. 4. According to FIG. 4, the group name of "NEW YEAR" and the photographed date of "Jan. 1, 2001" are displayed at the center of the screen, and the image number is displayed at the lower right of the screen.

It is noted that when the cross key 21 is operated in the right direction, the above-descried process is executed as to a next image to the current reproduced image, and when the cross key 21 is operated in the left direction, the above-described process is executed as to a previous image to the current reproduced image.

When the image display mode belonging to the multi-reproduction mode is selected, the CPU 15 reads nine compressed reduced image signals starting from an arbitrary compressed reduced image signal and image related information corresponding thereto from the recording medium 16 and writes the compressed reduced image signals and image related information read to the compressed image area 12*c* and the image related information area 12*a* of the SDRAM 12 through the memory control circuit 13, respectively.

The CPU 15 succeedingly applies an expansion instruction to the JPEG expansion circuit 11. The JPEG expansion circuit 11 reads the nine compressed reduced image signals from the compressed image area 12*c* through the memory control circuit 13, performs JPEG expansion on each of the compressed reduced image signals, and writes each of the expanded reduced image signal to the display image area 12*b* of the SDRAM 12 through the memory control circuit 13.

The video encoder 14 reads the nine reduced image signals from the display image area 12*b* through the memory control circuit 13, generates a composite image signal on the basis of the read reduced image signals and applies the generated composite image signal to the monitor 17. The CPU 15 reads the image number information from the image related information area 12*a* through the memory control circuit 13 and instructs the character generator 22 to output a character signal corresponding to the image number information. The CPU 15 further instructs the character generator 22 to output a character signal of the selection mark pointing any one of the reduced images. The character generator 22 generates the character signals indicative of the nine image numbers and the selection mark and applies the generated character signals to the monitor 17.

Thus, the nine reduced images based on the composite image signal and the nine image numbers and selection mark based on the character signals are displayed on the monitor 17 as shown in FIG. 5. According to FIG. 5, the screen is divided into nine, and respective of the divided screens are displayed with the reduced images. The image number is displayed at the lower right of each of the divided screens, and the selection mark points the reduced image having the image number of "003".

When the related information display mode belonging to the multi-reproduction mode is selected, the CPU 15 reads image related information corresponding to nine images starting from an arbitrary image from the recording medium 16 and writes the image related information to the image related information area 12*a* of the SDRAM 12 through the memory control circuit 13. The CPU 15 succeedingly reads the image number information from the image related information area 12 through the memory control circuit 13 and instructs the character generator 22 to output a character signal corresponding to the image number information. The CPU 15 further instructs the character generator 22 to output a character signal of the selection mark pointing any one of the image numbers. The character generator 22 generates the character signals indicative of the nine image numbers and the selection mark, and applies the generated character signals to the monitor 17.

Consequently, the nine image numbers are displayed on the monitor 17 as shown in FIG. 6. According to FIG. 6, the screen is divided into nine, and the image number is displayed at the lower right of each of the divided screens. The selection mark points the image number of "003".

It is noted that the selection mark moves on the screen in response to the operation of the cross key 21. When the selection mark is to be moved to an immovable direction, an image display is renewed.

Figure 7:
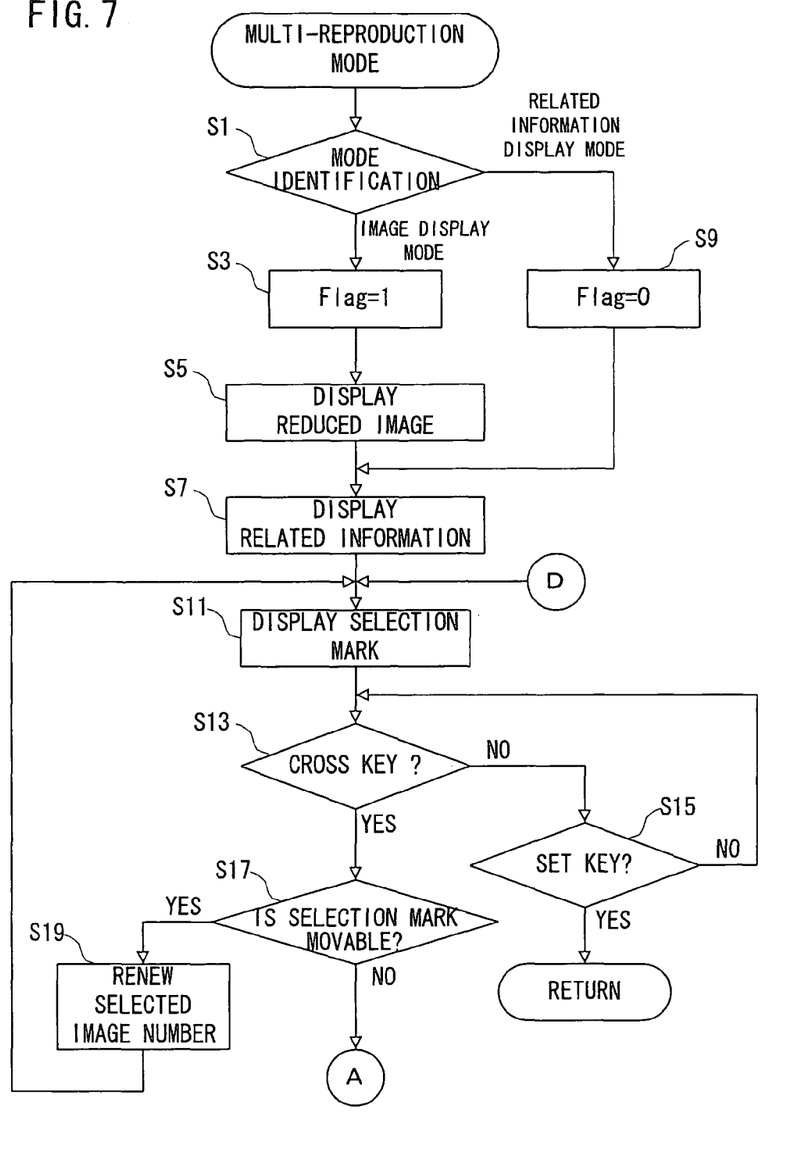
FIG. 7 is a flowchart showing a part of an operation of FIG. 1 embodiment in the multi-reproduction mode.
Figure 8:
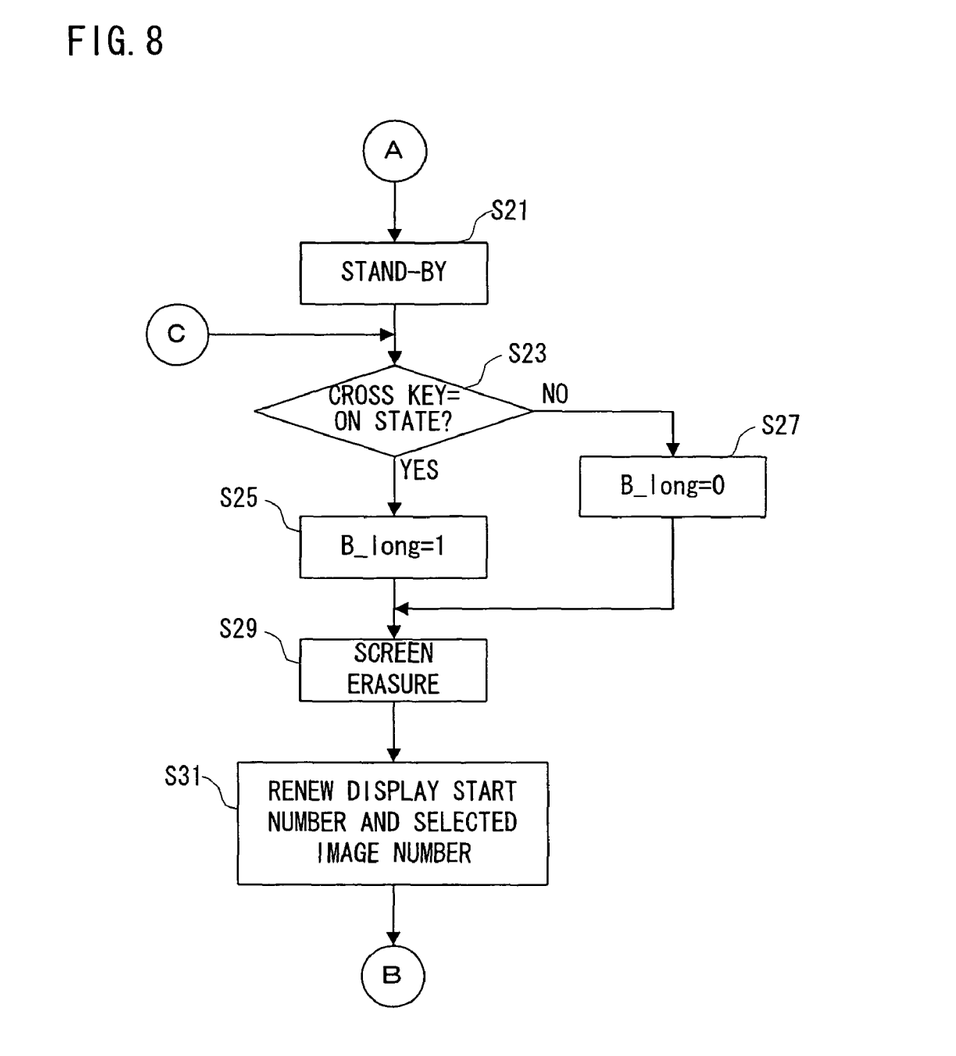
FIG. 8 is a flowchart showing another part of the operation of FIG. 1 embodiment in the multi-reproduction mode.
Figure 9:
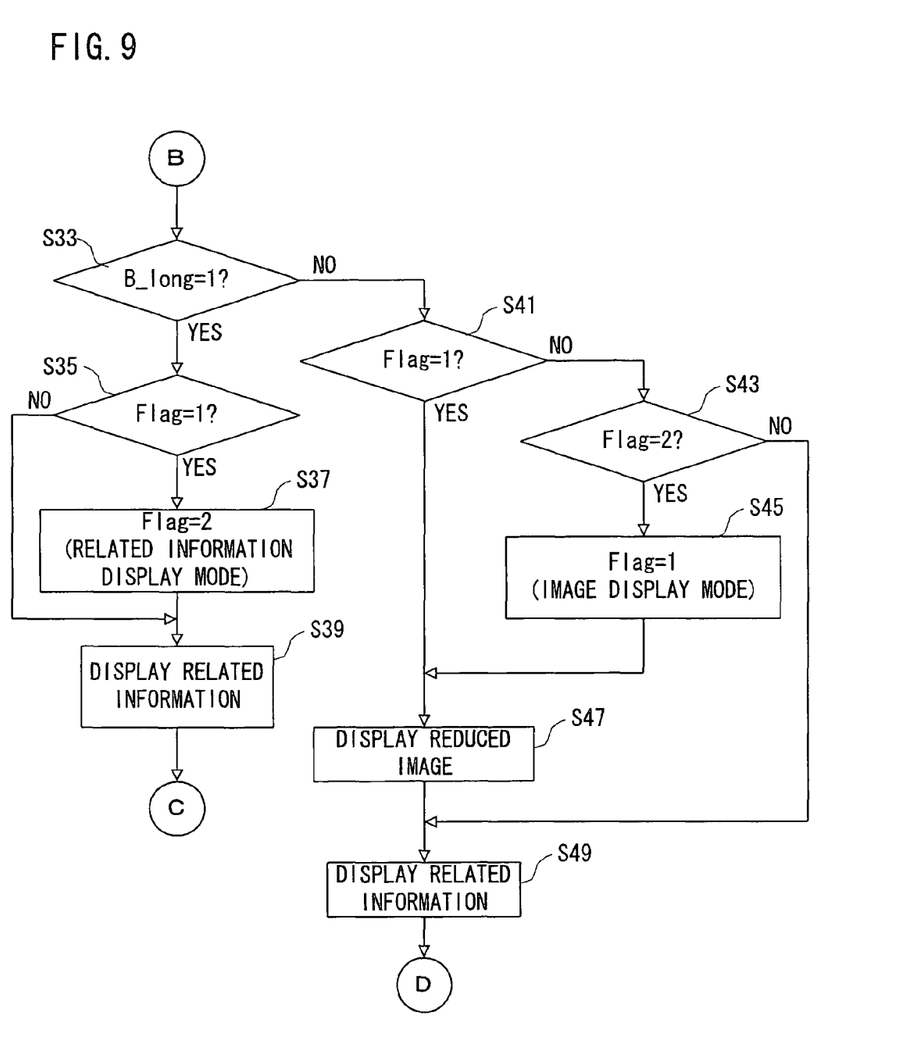
FIG. 9 is an illustrative view showing one example of a monitor screen on which a plurality of images are displayed in the multi-reproduction mode.

When the multi-reproduction mode is selected, the CP 15 performs a flowchart shown in FIG. 7 to FIG. 9. It is noted that a program corresponding to the flowchart is stored in a ROM 23.

Firstly, a current display mode is identified in a step S1. If the current display mode is the related information display mode, a mode flag Flag is set to "0" in a step S9, and then, the process proceeds to a step S7. On the other hand, if the current display mode is the image display mode, the mode flag Flag is set to "1" in a step S3, and a display process of the reduced images is performed in a step S5. Through the image display process in the step S5, nine compressed reduced image signals are read from the recording medium 16, each of the compressed reduced image signals read is subjected to a JPEG expansion, and nine reduced images based on the expanded nine reduced image signals are displayed on the monitor 17. After completion of the process in the step S5, the process proceeds to a step S7.

It is note that the compressed reduced image signals to be read first is specified on the basis of a display start number registered in an EEPROM 24. For example, if the registered display start number is "0010", nine reduced image signals starting from a compressed reduced image signal having the image number of "0010" are read from the recording medium 16.

In the step S7, a display process of the image related information corresponding to the nine reduced images displayed in the step S5 is performed. That is, the image related information corresponding to the nine reduced images is read from the recording medium 16, and the character generator 22 is controlled on the basis of the image number information included in the image related information. Thus, the image number is displayed at the low right of each of the reduced images. In a following step S11, the selection mark pointing any one of the reduced images is displayed on the monitor 17 by controlling the character generator 22.

It is noted that a display position of the selection mark is specified on the basis of the image selection numbers registered in the EEPROM 24. Position numbers from "1" to "9" are assigned to the nine divided screens formed on the monitor 17. Thus, if the registered image selection number is "7", the selection mark is displayed so as to point a divided screen having the position number of "7".

It is determined whether or not the cross key 21 is operated in a step S13, and it is determined whether or not the set key 20 is operated in a step S15. When the set key 20 is operated, the process shifts to the normal reproducing mode through an upper hierarchal routine so as to display a main image corresponding to the reduced image pointed by the selection mark on the monitor 17.

When the cross key 21 is operated, it is determined whether or not the selection mark is moveable in a step S17. If moveable, the selection image number is renewed in a step S19, and then, the process returns to the step S11. Consequently, the selection mark is moved in a desired direction. If the selection mark is immovable, the process in a step S21 and the subsequent are performed so as to renew the image display.

First, after standby for a predetermined time period in the step S21, it is determined whether or not the cross key 21 is in an on state in a step S23. When the on state is determined, a flag B_long is set to "1" in a step S25 and then, the process proceeds to a step S29 while an off state is determined, the flag B_long is set to "0" in a step S27, and then, the process proceeds to the step S29.

In the step S29, the image display is erased, and in a succeeding step S31, the display start number and the image selection number are renewed. When the image display is renewed in a forward direction, the image number of the compressed reduced image signal nine after is set as the display start number, and when the image display is renewed in a reverse direction, the image number of the compressed reduced image signal nine before is set as the display start number. Furthermore, the image selection number is set to "1".

In a step S33, a setting value of the flag B_long is identified. Herein, if the setting value is "1", it is assumed that the on state of the cross key 21 is continued more than a predetermined time period, and the setting value of the flag Flag is identified in a step S35. If the setting value is "0", that is, if the current display mode is the related information display mode, the process directly proceeds to a step S39. On the other hand, if the setting value is "1", that is, if the current display mode is the image display mode, the Flag is set to "2" in a step S37 and then, the process proceeds to the step S39.

In the step S39, the image related information is displayed anew in the same manner as the step S7. Thus, the image numbers of the nine compressed image signals starting from the renewed display start number are displayed on the monitor 17. After completion of the process in the step S39, the process returns to the step S23. Accordingly, when the cross key 21 is continued to be depressed, only the nine image numbers are displayed on the screen, and the image number is periodically renewed. At this time, a display/renewal of the reduced image is not performed and therefore, the image numbers are renewed at a high-speed.

If the setting value of the flag B_long is changed to "0" by canceling the depression of the setting key 21 or if the setting value of the flag B_long is "0" from the start, "NO" is determined in the step S33, and the setting value of the flag Flag is identified in steps S41 and S43.

If the setting value is "1", the current display mode is determined to be the image display mode, the reduced images are displayed on the monitor 17 in the same manner as the step S5 in a step S47, and the image related information is displayed on the monitor 17 in the same manner as the step S7 in a step S49. Thus, the nine reduced images starting from the renewed display start number and its image numbers are displayed on the screen. After completion of the process in the step S49, the process returns to the step S11.

If the setting value of the flag Flag is "0", the current display mode is determined to be the related information display mode and then, the process proceeds from the step S43 to the step S49. Thus, only the nine image numbers are displayed on the monitor 17.

If the setting value of the flag Flag is "2", it is determined that the setting key 21 is continued to be depressed in a state the image display mode is selected and thereafter, the depression of the set key 21 is canceled, the flag Flag is set to "1" in a step S45 so as to be returned to the image display mode. After completion of the process in the step S45, the reduced images and its image numbers are displayed on the monitor 17 in the step S47 and step S49, respectively.

As understood from the above description, the image reproduced from the recording medium 16 is displayed on the monitor 17 in the image display mode, and only the character relating to the image is displayed on the monitor 17 in the related information display mode. In either display mode, the monitor screen is renewed in response to the operation of the cross key 21. The CPU 15 determines an operating manner of the cross key 21 and validates the related information display mode when the on state of the cross key 21 is continued for a predetermined time period. In the related information display mode, it is not necessary to reproduce the image from the recording medium 16, and therefore, validating the related information display mode makes a screen renewal speed high, and whereby, it is possible to rapidly search the recorded image.

It is noted that when the image related information display mode belonging to the multi-reproduction mode is selected, only the image numbers are displayed in this embodiment; however, it is also appropriate that an image number mode, an image number/photographed date mode and an image number/photographed date/group name mode are provided at a lower hierarchy of the related information display mode, and any one of modes is selected by a key operation. When the image number mode is selected, only the image numbers are displayed in the same manner as this embodiment, when the image number/photographed date mode is selected, the image numbers and the photographed dates are displayed, and when the image number/photographed date/group name mode is selected, the image numbers, the photographed dates and the group names are displayed.

Also, although the image number is displayed together with the reproduced image in the image display mode in this embodiment, only the reproduced image may be displayed in the image display mode.

Furthermore, although the screen is renewed at a high speed by operating the cross key in the multi-reproduction mode in this embodiment, the screen may also be renewed at a high speed by operating the cross key in the normal reproduction mode. In this case, it is found out that the renewal of the screen is executed at a high speed by maintaining the normal reproduction mode during the operation of the cross key, or shifting from the normal reproduction mode to the multi-reproduction mode occurs so as to execute a renewal of a screen at a high speed when the cross key is depressed more than a predetermined time period, and it is returned from the multi-reproduction mode to the normal reproduction mode when the depression of the cross key is canceled.

Furthermore, in this embodiment, the high-speed screen renewal is started at a time the cross key is depressed for a predetermined period, and the high-speed screen renewal is interrupted at a time the depression of the cross key is canceled. However, it is also appropriate that after the high-speed screen renewal is started, the high-speed screen renewal is continued irrespective of cancellation of the depression, and the high-speed screen renewal is interrupted by operating the cross key again. In addition, it is also possible that the high-speed screen renewal is started by double-clicking the cross key, and the high-speed screen renewal is interrupted by double-clicking the cross key again.

Figure 10A:
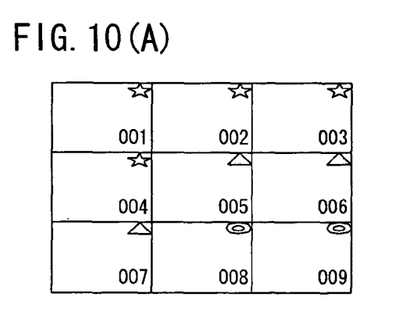
FIG. 10(A) is an illustrative view showing another example of an image displayed on the monitor in the related information display mode belonging to the multi-reproduction mode.
Figure 10B:
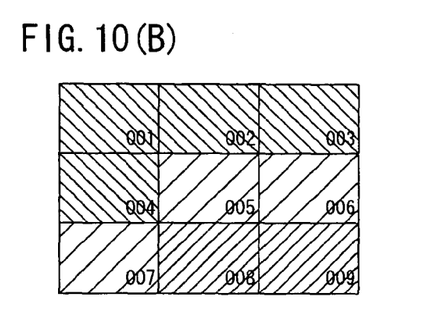
FIG. 10(B) is an illustrative view showing the other example of an image displayed on the monitor in the related information display mode belonging to the multi-reproduction mode.

Furthermore, when the related information display mode belonging to the multi-reproduction mode is selected, only the image number is displayed in this embodiment; however, it is also appropriate that visual identifying information such as a mark or a background color is assigned to each of groups, and different marks are displayed together with the image numbers depending upon groups (see FIG. 10(A)) or different background colors are displayed together with the image numbers depending upon groups (see FIG. 10(B)). Thus, it is possible to identify a group at a time of the high-speed screen renewal.

Figure 11:
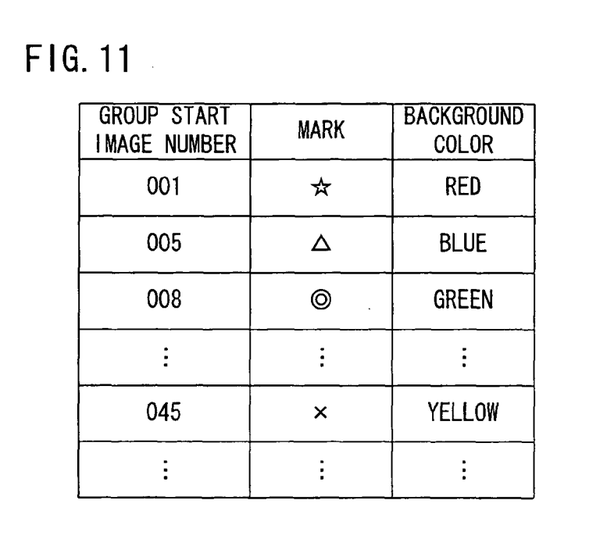
FIG. 11 is an illustrative view showing one example of a group information table.

It is noted that in this case, it is necessary to create a group information table shown in FIG. 11. According to FIG. 11, group start image numbers being image numbers of heads of respective groups are registered in the table, and the marks and the background colors are assigned to the respective image numbers. When the related information display mode belonging to the multi-reproduction mode is selected, a mark or a background color is detected from such the table, and the same mark or the same background color is displayed on a divided screen having an image number belonging to the same group.

It is noted that grouping may be automatically performed on the basis of the photographing date information on photographing or may be manually performed. Changing the automatic grouping to the manual grouping improves operability.

In addition, it is no need to prepare the marks or the background colors for identifying the groups by the number of the groups formed within the recording medium, and it is enough to prepare them at least by the number of the divided screens formed on the monitor. It is noted that if a mark or a background color assigned to different groups from each other appear on the same screen due to erasing or moving the recorded image, operability is sharply reduced. Thus, every erasure or movement, the mark or the background color should be assigned again.

Figure 12:
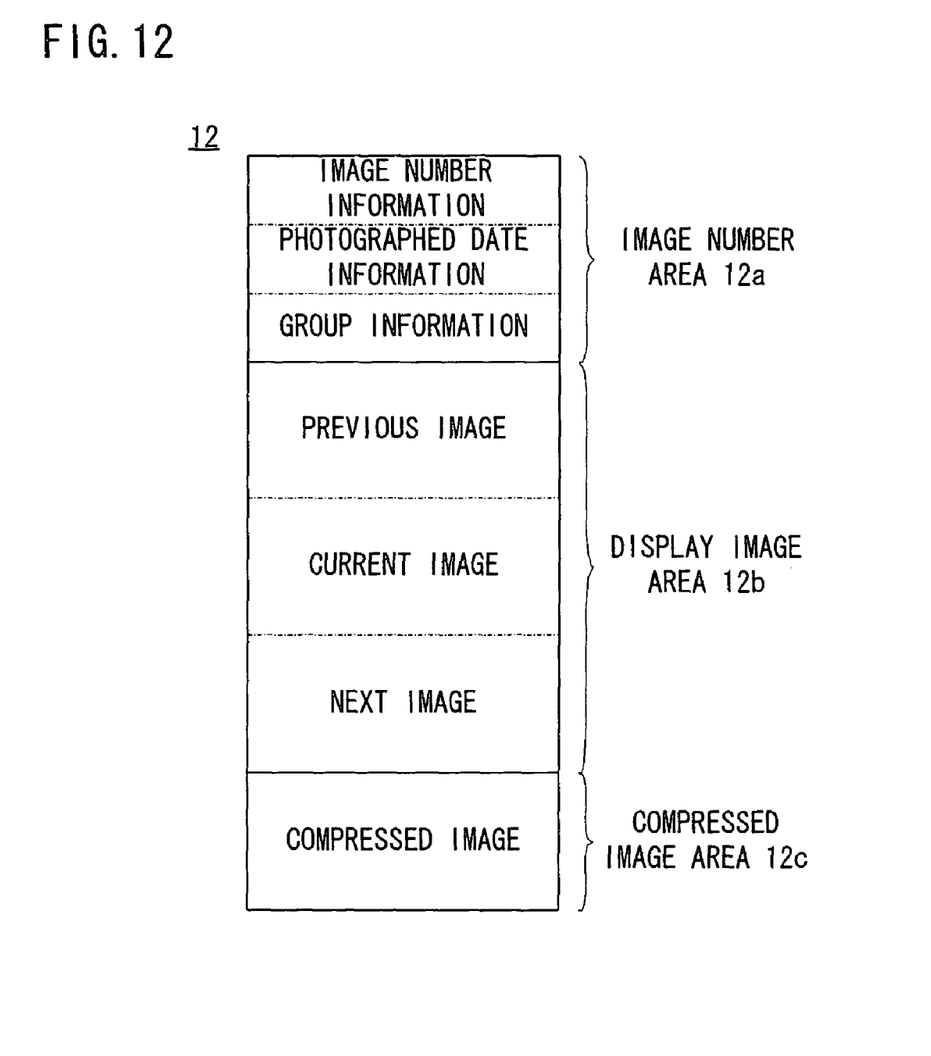
FIG. 12 is an illustrative view showing another mapping state of the SRAM provided in the FIG. 1 embodiment.

Furthermore, in this embodiment, the display image area formed in the SDRAM is formed as shown in FIG. 2, and only the main image signal of the current frame or the reduced image signals of nine frames are stored in the display image area. However, it is also appropriate that as shown in FIG. 12, the display image area has a capacity capable of storing 3 frames of the main image signals or 27 frames of the reduced image signals, and the main image signal of a previous frame and the main image signal of a next frame or the reduced image signals of preceding 9 frames and the reduced image signals of following 9 frames are stored in the display image area. Thus, it is possible to speed up the renewal of the screen in the image display mode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reproducing apparatus which displays a reproduced image based on image information recorded in a recording medium, said image information including compressed image data and related information that is related to said compressed image data and includes at least an image number, comprising:
   a mode setter which sets a reproducing mode;
   a storage device that stores said image information read from said recording medium in said reproducing mode;
   an input operating device that is operated by a user to input a renewing instruction that instructs renewal of the image number in said reproducing mode;
   a status setter that sets a first state at a time when said input operating device is continuously pressed in a single depression more than a predetermined time period and a second state at a time when said input operating device is not continuously pressed in a single depression more than said predetermined time period, the first state being where only characters are displayed and no image is displayed, the second state being where an image or images are displayed;
   a renewer that renews the image number of the image information stored in said storage device in response to said renewing instruction, the renewer automatically renewing the image number of the image information at a relatively high rate of speed when the first state is set by the status setter;
   a related information displayer that displays on said monitor screen at least the image number and excluding the reproduced image for each time that the image number is renewed by said renewer;
   a decompressor that reads the compressed image data corresponding to the image number at a time that renewal of the image number by said renewer is stopped and said status setter sets said second state, and subjects the compressed image data to a decompression process to produce decompressed image data; and
   a reproduced image displayer that displays on said monitor screen the reproduced image in accordance with the decompressed image data produced by said decompressor.

2. An image reproducing apparatus according to claim 1, further comprising a renewal suspender that suspends a renewing operation by said renewer.

3. An image reproducing apparatus according to claim 2, wherein said renewal suspender includes a release of said input operating device.

4. An image reproducing apparatus according to claim 1, wherein said reproducing mode includes a first reproducing mode where only one image is displayed on said monitor screen and a second reproducing mode where a plurality of size-reduced images are simultaneously displayed on said monitor screen.

5. An image reproducing apparatus according to claim 2, wherein said reproducing mode includes a first reproducing mode where only one image is displayed on said monitor screen and a second reproducing mode where a plurality of size-reduced images are simultaneously displayed on said monitor screen.

6. An image reproducing apparatus according to claim 3, wherein said reproducing mode includes a first reproducing mode where only one image is displayed on said monitor screen and a second reproducing mode where a plurality of size-reduced images are simultaneously displayed on said monitor screen.

7. An image reproducing apparatus according to claim 4, wherein in said first reproducing mode, said related information displayer displays only one image number, while in said second reproducing mode, said related information displayer displays a plurality of image numbers simultaneously.

8. An image reproducing apparatus according to claim 1, wherein a plurality of images recorded on said recording medium are classified into a plurality of groups, and said related information includes identifying information for identifying a group to which said reproduced image belongs.

9. An image reproducing apparatus according to claim 8, wherein said related information displayer displays the identifying information as well as the image number.

* * * * *